March 3, 1970    R. VIT    3,498,347
APPARATUS FOR HARVESTING TREES
Filed Aug. 14, 1967    8 Sheets-Sheet 1

FIG. 1

INVENTOR
Rudy VIT

ATTORNEY

FIG. 3

INVENTOR
Rudy VIT

March 3, 1970 R. VIT 3,498,347
APPARATUS FOR HARVESTING TREES
Filed Aug. 14, 1967 8 Sheets-Sheet 4

FIG. 4

INVENTOR
Rudy VIT

ATTORNEY

March 3, 1970  R. VIT  3,498,347
APPARATUS FOR HARVESTING TREES
Filed Aug. 14, 1967  8 Sheets-Sheet 5

INVENTOR
Rudy VIT
ATTORNEY

March 3, 1970          R. VIT          3,498,347
APPARATUS FOR HARVESTING TREES
Filed Aug. 14, 1967          8 Sheets-Sheet 6

INVENTOR
Rudy VIT

ATTORNEY

March 3, 1970    R. VIT    3,498,347
APPARATUS FOR HARVESTING TREES
Filed Aug. 14, 1967    8 Sheets-Sheet 7

INVENTOR
Rudy VIT

ATTORNEY

FIG. 15

INVENTOR
Rudy VIT
ATTORNEY

United States Patent Office 3,498,347
Patented Mar. 3, 1970

3,498,347
APPARATUS FOR HARVESTING TREES
Rudy Vit, Ste. Therese, Quebec, Canada, assignor to Sicard, Inc., Montreal, Quebec, Canada
Filed Aug. 14, 1967, Ser. No. 660,302
Claims priority, application Great Britain, Apr. 4, 1967, 15,305/67
Int. Cl. B27b 29/00
U.S. Cl. 144—3
8 Claims

ABSTRACT OF THE DISCLOSURE

The apparatus comprises an articulated vehicle having a front and a rear hinged chassis with a tree grabbing and cutting arrangement mounted on the front chassis and a pair of tree bunching arms on the rear chassis for bunching and holding the cut trees when the vehicle is moving.

---

The present invention relates generally to material handling equipment and more particularly to a mobile unit for harvesting trees.

It is the aim of the present invention to provide a novel apparatus for felling and bunching trees which is time saving, fully manoeuvrable and is particularly designed for use in the field under hazardous winter conditions, such as deep snow.

A construction in accordance with the present invention comprises a mobile vehicle having a novel feller unit made up with a frame including a pair of grippers for gripping a standing tree and hydraulic shear means spaced below the grippers for shearing the base of a tree. The feller unit is universally mounted to the front part of a vehicle which is articulated midway along its longitudinal axis between its front and rear axles. The rear part of the vehicle supports a novel buncher unit including a pair of upwardly extending, articulated arms which subtend a sling. The articulated arms, which are in a plane transverse to the longitudinal axis of the rear part of the vehicle, are pivoted and articulated in such a way so as to cross each other and bunch a bundle of logs which have been placed on the rear part of the vehicle by the feller unit.

Having thus generally described the invention, it will now be referred to in more detail by reference to the accompanying drawings illustrating a preferred embodiment of the invention and in which.

The tree-harvesting apparatus 10 shown in the drawings includes the following main parts: an articulated mobile vehicle, which includes a front axle assembly 12 and a rear axle assembly 14. The front axle assembly mounts a cab 16, while the engine 18 is mounted midway on the rear axle assembly 14. The feller unit 20 is mounted to the front axle assembly 12 by means of a cradle 23. The buncher unit 22 is mounted on the forward portion of the rear axle assembly 14.

Figure 6:
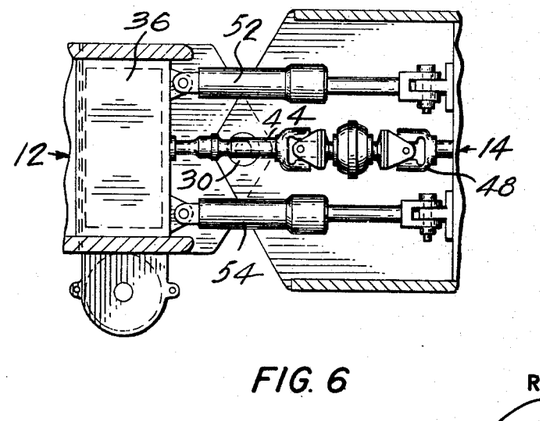
FIGURE 6 is a horizontal cross section taken along line 6—6 of FIGURE 1.

The front axle assembly 12 and the rear axle assembly 14 are hinged together at the midpoint between their axles 24 and 26 by means of pivot brackets and pins 28 and 30. The drive is supplied from the engine 18 through a universal coupling 32 to the spline drive shaft 34 which is adapted to expand and retract longitudinally in response to the hinged movement of the front axle assembly with respect to the rear axle assembly 14. The forward end of the spline drive shaft 34 is connected to the transmission 36 by means of a universal coupling 38. The transmission 36 in turn transmits the drive to the front axle 24 through a drive shaft 42 and a differential 40. The drive is communicated to the rear axle 26 from transmission 36 by means of a spline drive shaft 44 which is coupled on a pillow block mounting 46 to a drive shaft 48, which is in turn coupled to a differential 50 and finally to the rear axle 26. Also provided between the front axle assembly 12 and the rear axle assembly 14 are a pair of steering cylinders 52 and 54. These steering cylinders 52 and 54, as shown in FIGURE 6, are spaced on each side of the longitudinal axis of the mobile unit and respond to a control in the cab to articulate the front axle assembly 12 and the rear axle assembly 14 and also controls positioning of the cutting head.

The cab 16 which is mounted on the same housing as the transmission 36 of the front axle assembly 12 is actually pivoted about a horizontal, longitudinal axis to an undercarriage 56 by means of hinged brackets and pivot pins 58 and 60. Therefore, if the wheel of the front axle assembly 12 enters a pot hole, the undercarriage 56 and the axle 24 will tilt, but the housing mounting the cab and transmission 36 of the front axle assembly 12 and the complete rear axle assembly 14 will remain upright.

Figures 7, 8, 9, 10:
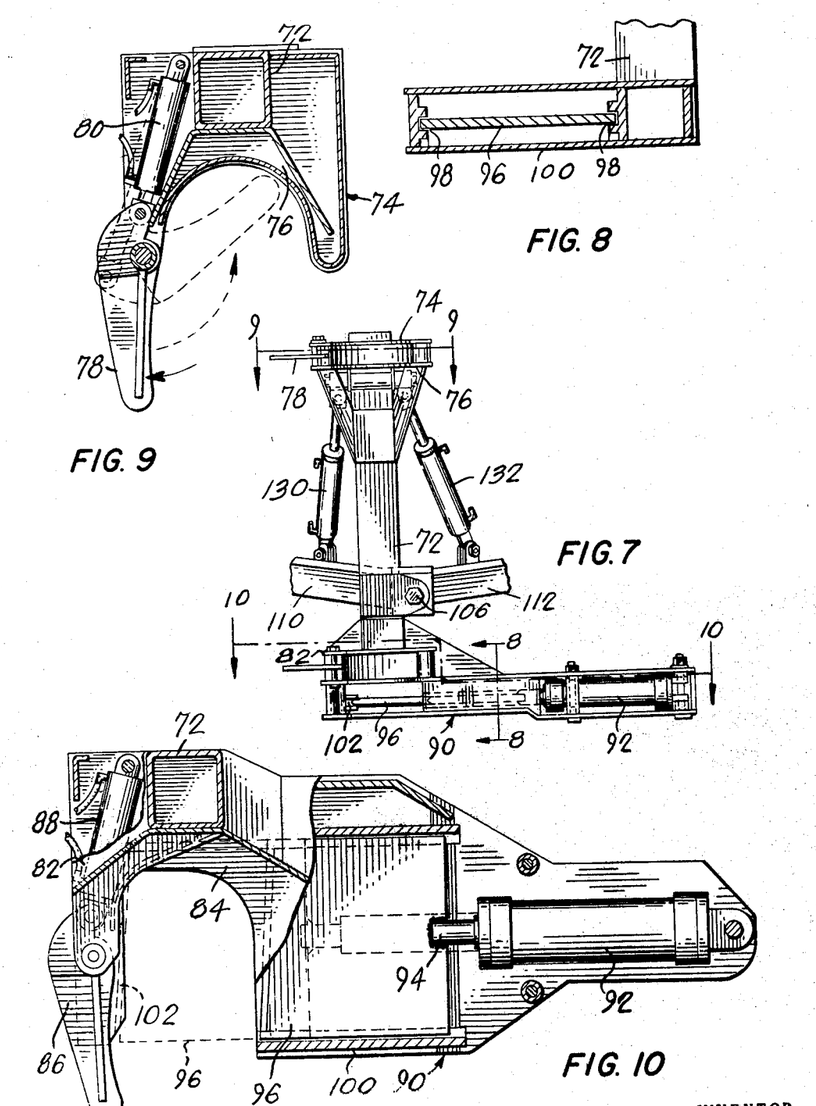
FIGURE 7 is a front elevation view showing the feller unit partly in section.
FIGURE 8 is a vertical cross section taken along line 8—8 of FIGURE 7.
FIGURE 9 is a horizontal cross section taken along line 9—9 of FIGURE 7.
FIGURE 10 is a horizontal cross section taken along line 10—10 of FIGURE 7 and with some panels removed to show the details thereof.

The feller unit 20 includes a generally upright box frame member 72 on which is mounted a top clamp 74 near the uppermost portion thereof which includes a clamp platform 76 and a pivoted clamp arm 78 which move to and from the platform 76 by means of a cylinder 80. Similarly, a lower clamp 82, identical to clamp 74, is provided on the box frame member 72 at the lower end thereof and includes a clamp platform 84 and a clamp arm 86 which is open and closed by a cylinder 88.

Directly under the clamp portion 84 is provided a shear unit 90 which is mounted laterally of the axis of box frame member 72. The shear unit 90 includes a master cylinder 92, and a piston rod 94 which operates the shear blade 96 to and fro within guide tracks 98 in the shear unit housing 100. The blade 96 has a cutting edge which is preferably at a 3° horizontal angle to the longitudinal axis of the vehicle. The angle of the blade converges outwardly from the frame member 72. The blade 96 is adapted to move to and fro towards a slot 102 across a tree-receiving opening 104 in the housing 100 by the action of the cylinder 92 and piston rod 94. The cutting edge is V-shaped with the apex thereof lying in a plane extending midway of the thickness of the blade 96. The sloping surfaces of the V meet at a 45° angle and they are symmetrical.

The feller unit 20 is mounted on a trunnion 106 hinged to the forward portion of the connecting frame 108 which forms part of the cradle 23. The connecting frame includes frame members 110 and 112 which form a slight V and a cross member 114 which extends between the end of the members 110 and 112 to form a structural triangle. Connecting frame member 116 extends rearwardly from the apex of the triangle formed by members 110 and 112 and is also connected to the cross member 114. Another similar member 118 extends rearwardly from the junction formed by cross member 114 and member 112. Cradle members 23a and 23b are integral with the undercarriage of the front axle assembly 12 on each side of the cab 16 respectively. The members 116 and 118 are pivoted to the cradle members 23a and 23b by means of pivot pins 120 and 122 on each side of the cab 16. Leverage plates 124 and 126 are provided near the rearward portions of the frame members 116 and 118 and are connected to the piston rods of cylinders 127a and 127b which are in turn connected to the other end of the cradle members 23a and 23b on the extensions 128a and 128b respectively. On each side of the box frame member 72 are provided cylinders 130 and 132 which are connected at spaced-apart points to the cross member 114. The cylinders 130 and 132 control the universal movement of the feller unit 20 on the universal joint 106. Of course, the cylinders 127a and 127b provide the hinged movement of the feller unit 20 and connecting frame members 116 and 118 from an upright position shown in FIGURE 1 to a delivery position shown in dotted lines in FIGURE 1.

Figure 5:
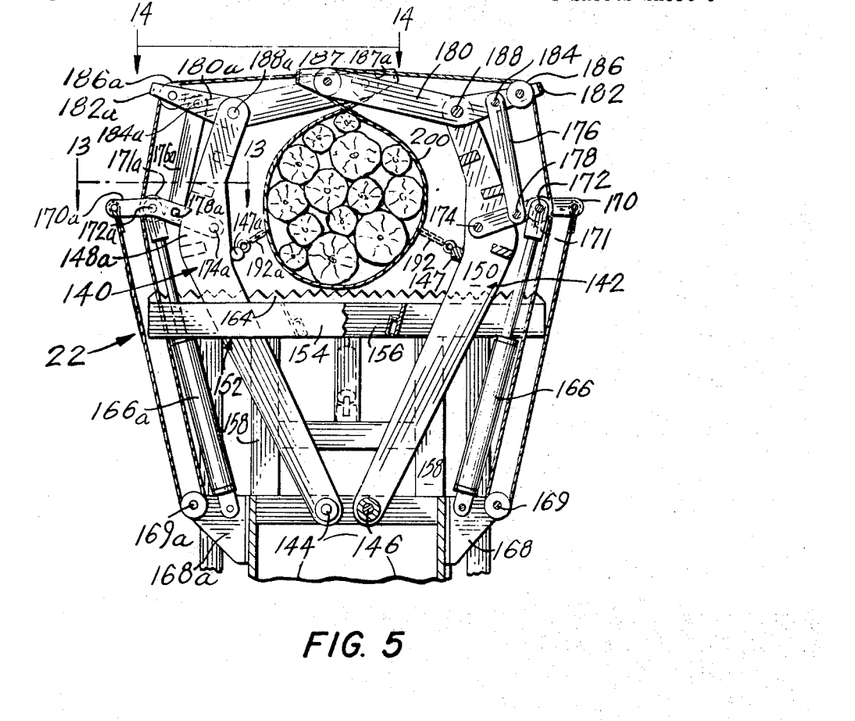
FIGURE 5 is a partial view similar to FIGURE 4 showing one arm partly in cross section and the articulated arms in a bunching position.
Figures 11, 12, 13:
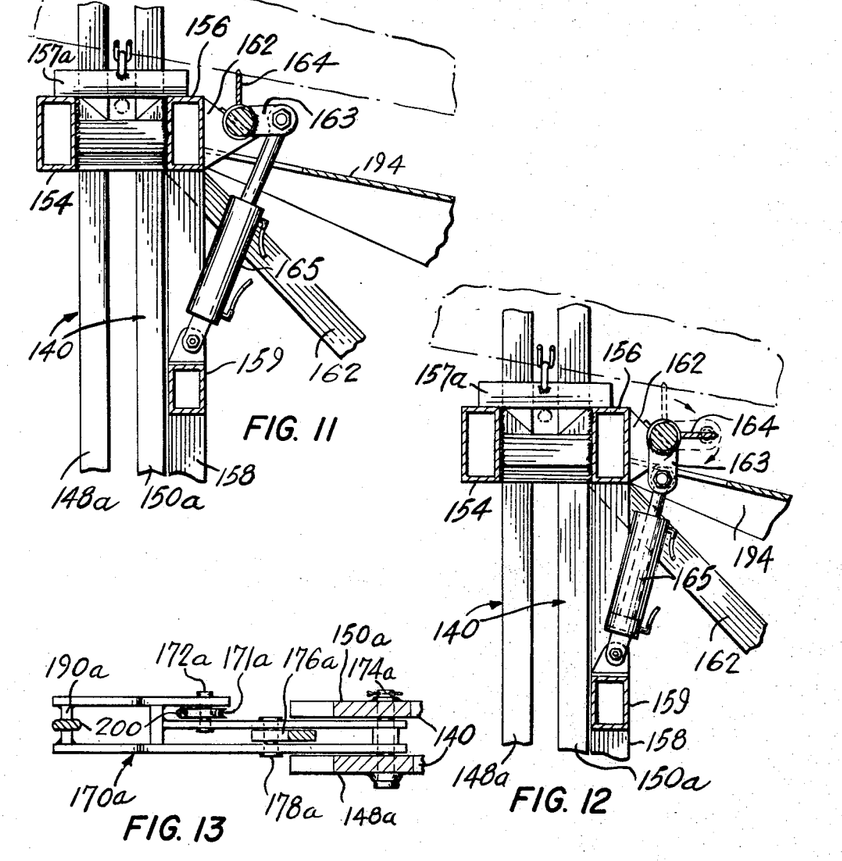
FIGURE 11 is a vertical cross section taken along line 11—11 of FIGURE 4.
FIGURE 12 is a similar cross section of FIGURE 11 showing a detail thereof in a different position.
FIGURE 13 is a horizontal cross section taken through line 13—13 in FIGURE 5.
Figure 14:
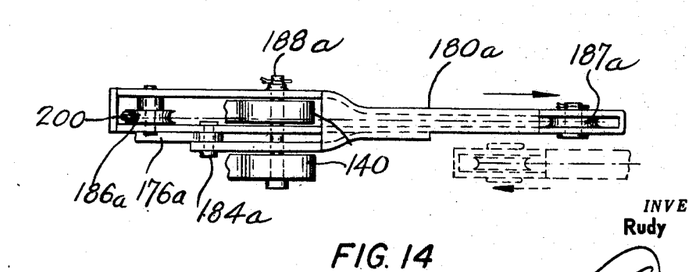
FIGURE 14 is a detailed view taken along line 14—14 in FIGURE 5, showing an element in the bunching unit.

The buncher unit 22 is mounted on the rear axle assembly 14 and includes a pair of transversely pivoted buncher arms 140 and 142. The buncher arms 140 and 142 pivot in a lateral plane relative to the longitudinal axis of the rear axle assembly by means of pivot pins 144 and 146 respectively. Each buncher arm 140 or 142 is made double with beams 148 and 150, as shown in FIGURES 5 and 13 of the drawings, and are slightly crooked. The buncher arms 140 and 142 are adapted to pivot within a guide member 152 which includes spaced-apart beams 154 and 156. Stop members 157 and 157a are provided on the arms 142 and 140 respectively to limit the pivoting movement of arms 140 and 142 against the guide member 152. The double beam guide member 152 itself is supported by uprights 158 provided on either side of the rear axle assembly 14. The uprights 158 are mounted to the rear axle assembly 14 by means of brackets 160. Lean-to-supports 162 are provided to support each upright 158 and they are connected directly to the shaft housing 64.

On the rear beam member 156, brackets 162 are mounted, to which is journalled an elongated toothed rack 164. On each end of the toothed rack 164 is a crank lever 163 which is in turn connected to a control cylinder 165 connected at its other end to cross member 159 which moves the toothed rack 164 from an upright position to a horizontal position, as shown in FIGURES 11 and 12.

Since both buncher arms 140 and 142 are symmetrical, only one buncher arm, that is, buncher arm 142, will be described and the related parts on the other buncher arm 140 will be raised by the subscript a.

A cylinder 166 is connected to one end of the cylinder bracket 168 on the side of the rear axle assembly 14, and at its piston end to a pivoted lever 170 near the crook in the buncher arm 142 by means of a pivot pin 172. The lever 170 is itself pivoted between the beam members 148 and 150 on a pivot pin 174. A linking arm 176 is also provided between the crook beam members 148 and 150 and is connected to the lever 170 by means of a pivot pin 178. The other end of the linking arm 136 is connected to the lever end 182 of a bell crank arm 180 by means of pivot pin 184. A pulley 186 is provided on the bell crank end 182 and a pulley 187 is provided at the other end of the bell crank arm 180. The bell crank arm 180 is connected to the buncher arm 142 between the beams 148 and 150 by means of a pivot pin 188.

Sling 200 is attached at one end thereof to the end 190 of the lever 170, and passes down and around pulley 169 on the bracket 168, up and around the outside of pulley 171 on pivot pin 172, and about pulley 186 on bell crank end 182, over the pulley 187 at the other end of the bell crank arm 180. It is slung between the bell crank arms 180 and 180a and held in an open position by chains 192 and 192a on the buncher arms 142 and 140 respectively. The sling cable 200 then passes over a similar path on arm 140 passing over pulleys 187a, 186a, down to pulley 171a to pulley 169a and up to the end 190a of lever 170a, where it is secured. These chains 192 and 192a always hold down the sling 200 so that the load is always centered between the arms 140 and 142.

Behind the buncher assembly is a log chute 194 which is mounted on chute supports 196 directly to the shaft housing 164 and to the rear axle assembly 14.

Figure 15:
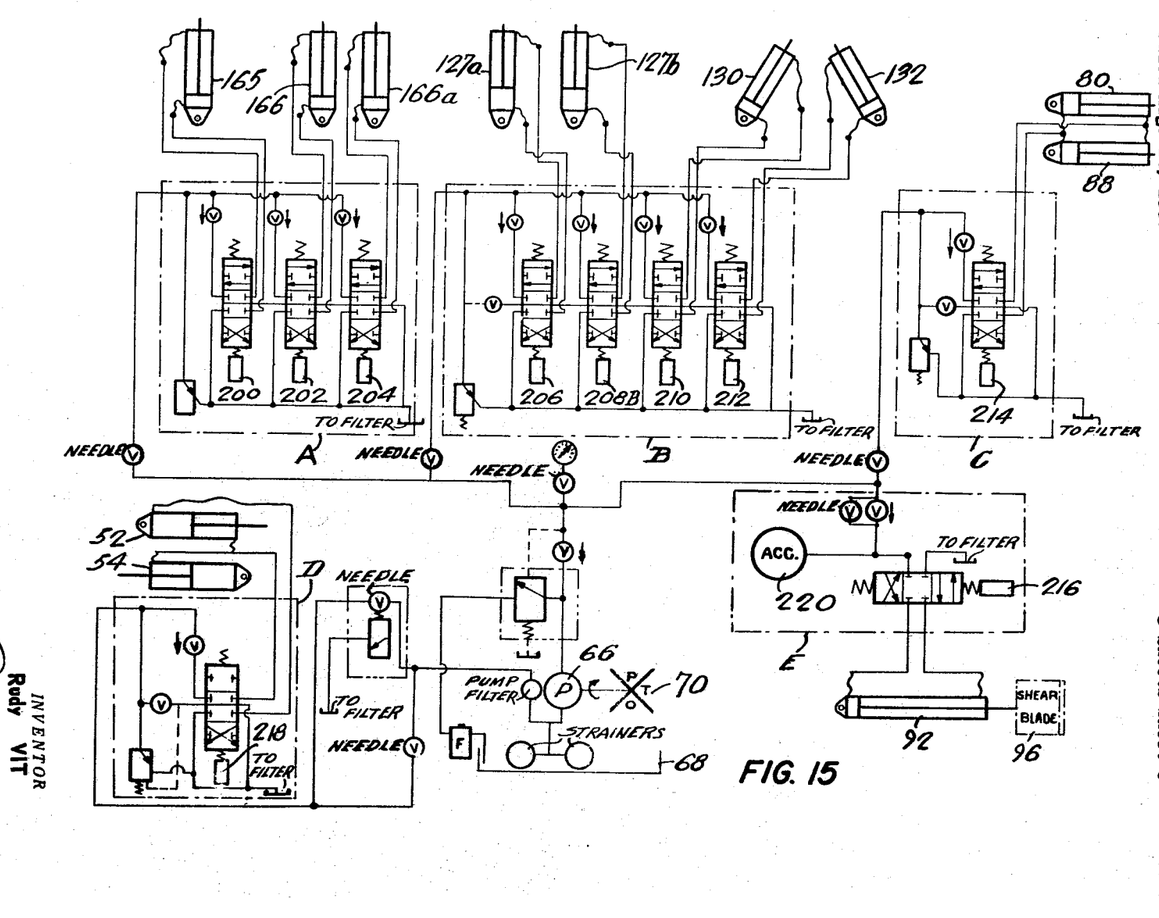
FIGURE 15 is a schematic diagram showing generally the hydraulic system of the apparatus.

Referring to FIGURE 15, which shows a schematic diagram of the hydraulic system, blocks A, B, C, D and E are located in the cab 16 on a control panel. In each block, conventional levers or push button valves are shown which control the flow of fluid from the pump 66 through the conduits and to the respective cylinders.

Briefly, referring to block A, the lever valve 201 will control the two-way flow of fluid into the cylinder 165 to move the toothed rack 164. Similarly, actuation of the control levers 202 and 204 either simultaneously or independently will determine the pressure side of the cylinders 166 and 166a which operate the buncher arms 142 and 140 respectively.

Figure 1:
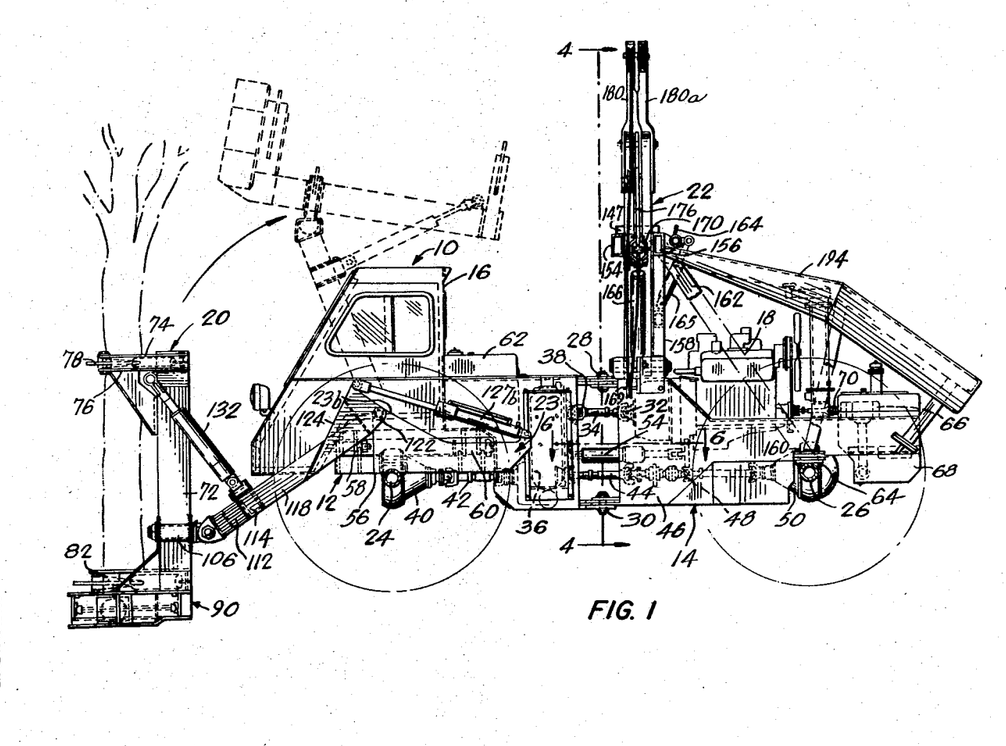
FIGURE 1 is a side view taken in elevation of the hydraulic feller buncher.
Figure 2:
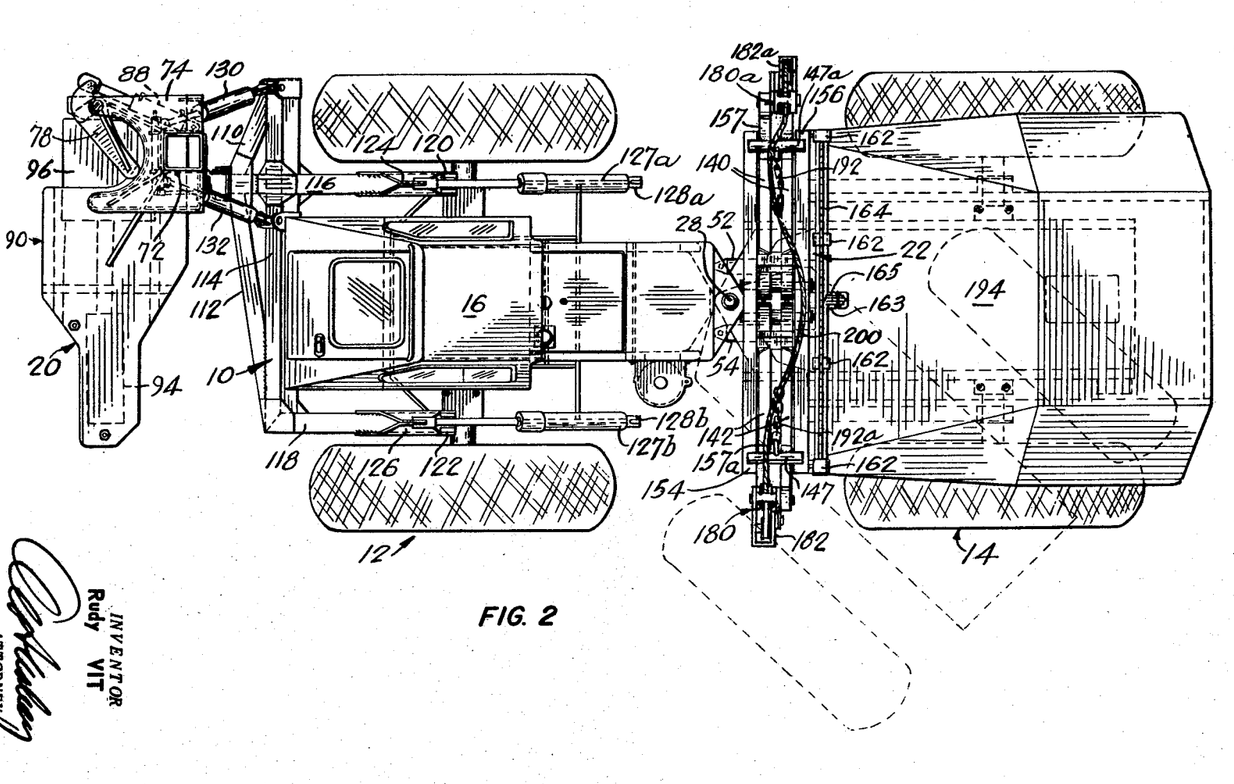
FIGURE 2 is a top plan view of the feller buncher shown in FIGURE 1.
Figure 3:
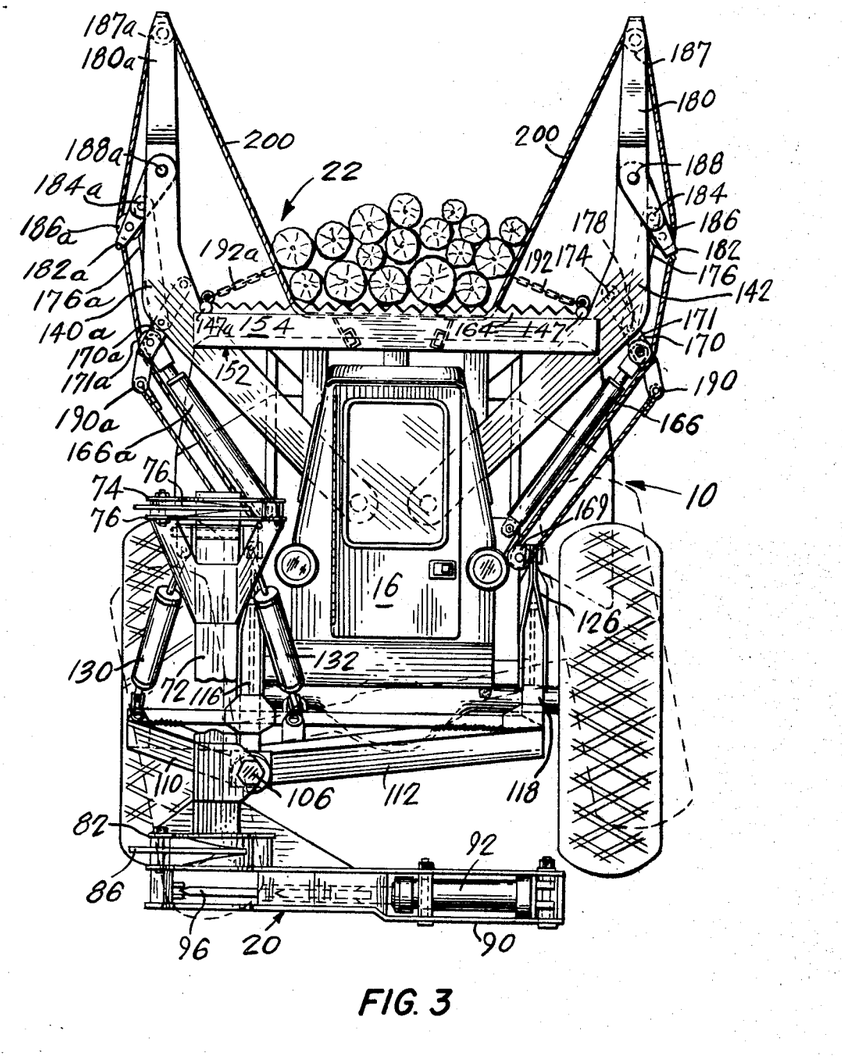
FIGURE 3 is a front view taken in elevation of the feller buncher and showing logs in position on the buncher apparatus.
Figure 4:
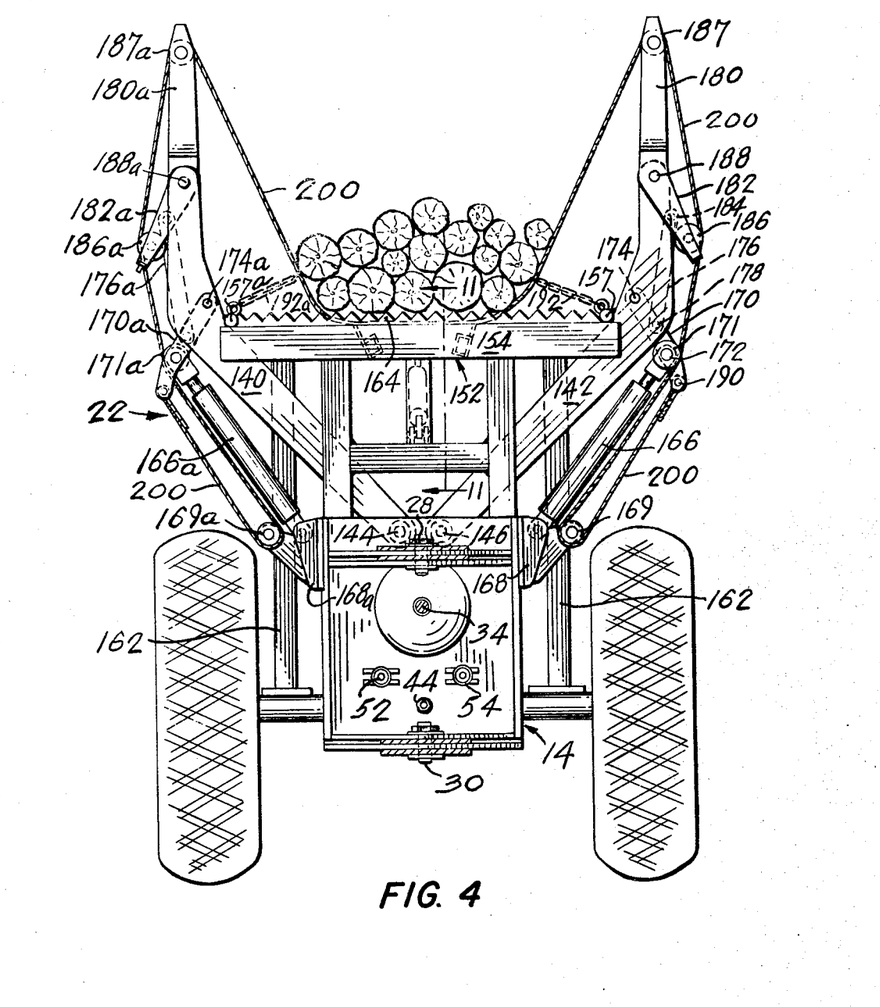
FIGURE 4 is a vertical cross section taken along line 4—4 of FIGURE 1.

In block B, on the control panel, manual actuation of the levers 206 and 208, which should be actuated simultaneously, will force fluid into one side or the other of the cylinders 127a and 127b pivoting the connecting frame members 116 and 118 between a position where the feller unit 20 is forward and a position where the feller unit is situated above the cab 16 as shown in FIGURE 1. In the same block B, actuation of the valves 210 and 212 independently will control the flow of fluid through their respective valves to the cylinders 130 and 132 which control the universal movement of the feller unit 20.

In block C, on the control panel, actuation of the lever 214 will result in a simultaneous opening or closing of the arms 70 and 86 of the gripping apparatus on the feller unit 20.

In order to operate the shear blade 96 and the shearing unit 90, the operator must actuate the lever control valve 216 in block E on the control panel.

Similarly, the steering arrangement of the tree-harvesting unit 10 comprises the cylinders 52 and 54 connected in opposite directions in parallel relation between the front axle assembly 12 and the rear axle assembly 14. Operation of the lever-operated valve 218 in one direction will cause the cylinder 52 to reverse and the cylinder 54 to move forward, thereby forcing the front axle assembly 12 and the rear axle assembly 14 to fold about the axis of the pivot pins 28 and 30. Of course, the steering of the unit can be reversed by reversing the direction of the lever 218.

The hydraulic system is supplied from the reservoir 68 on the rear axle assembly 14 and is fed by a pump 66 which is driven directly from the engine 18 by means of the drive shaft 70.

The particular embodiment which has been described above has a weight distribution of 11,000 lbs. on the front axle assembly 12 and 6,000 lbs. on the rear axle assembly 14 when it is empty. The ratio, therefore, of the front to the rear assembly, when empty, is 1.85:1. However, when the logs are loaded on the rear axle assembly and the buncher unit 20, the weight is then approximately 11,000 lbs. on the rear axle assembly 14. The ratio is then, when loaded, approximately 1:1. This is optimum performance.

OPERATION

To begin with, the articulated vehicle 10 which is hinged at the pivot pins 28 and 30 is very rapidly articulated by means of steering cylinders 52 and 54 as described above. It has been shown in the field, that when the vehicle is in deep snow and particularly since most of the weight is on the front axle assembly 12, when empty, the rear axle assembly 14 tends to skid when the vehicle is articulated by means of the cylinders 52 and 54 which are actuated by the lever-operated valve 218 in block D on the control panel. When in deep snow, this skidding action creates a force against the snow bank and forces the vehicle into slight forward movement. When the vehicle 10 is articulated rapidly and in succession, the action is somewhat similar to that of a fish in water; and, therefore, the vehicle can be said to be swimming in the deep snow.

The feller unit 20 operates in the following way: when the vehicle 10 is brought up to a tree, the blocks B and C are referred to on the control panel and the levers 206, 208, 210 and 212 are actuated by the operator until the cylinders 127a, 127b, 130 and 132 have aligned the feller unit 20 with the tree, then the cylinders 80 and 88 are activated by means of lever 214 to open the clamp arms 78 and 86 and then close them on the tree to grasp the tree tightly. The lever 214 is left in a position when the line of fluid to cylinders 80 and 88 is always open, keeping a pressure in the cylinders 80 and 88 to continuously force the arms 78 and 86 to close tightly on the clamped tree until the tree is delivered. The powerful cylinder 92 in the shear unit 90 is then activated by actuating the lever 216 in the block E on the control panel. The shear blade 96 then shears the base of the tree somewhat like a guillotine. The 3° angle on the blade 96 wedges the tree inwardly while it is being sheared.

Once the tree has been sheared, the connecting frame members 110, 112, 114, 116 and 118 are then pivoted upwardly about pins 120 and 122 on the cradle members 23a and 23b by actuating the levers 206 and 208 in the block B on the control panel, until the feller unit 20 reaches a delivery position as shown in dotted lines in FIGURE 1. Simultaneously, the clamp arms 78 and 86 are opened by reversing the cylinders 80 and 88, thereby delivering the tree to the buncher unit 22 and the log chute 194.

Once the tree is received by the buncher unit 22, the cylinders 166 and 166a are operated by actuating the levers 202 and 204 in block A to close the buncher arms 140 and 142. As the piston rod in the cylinders 166 and 166a progressively extends, the levers 170 and 170a pivot upwardly pushing the linking arms 176 and 176a, which in turn pivot the bell crank 180 and the bell crank end 182. Once the bell crank arms 180 and 180a have been extended to their limit, but the piston rods of the cylinders 166 and 166a keep on extending, the buncher arms will then pivot until the opposite bell crank arms 180 and 180a, which are slightly offset from each other, cross each other, thereby looping the cable 200 which encircles the log or logs tightly, suspending the load on the cable 200 from the two end pulleys 187 and 187a in such a way that the load is centered over the rear axle assembly 14 and allows the vehicle greater manoeuvrability.

The operator who is sitting in the cab 16 then advances the articulated vehicle to the next tree and the cycle is repeated.

What is claimed is:

1. An apparatus for harvesting trees comprising an articulated vehicle having a front and rear chassis hingedly joined about a vertical axis, a feller means pivotally mounted on the front chassis and a buncher means on the rear chassis for receiving felled trees, said feller means being operative to pivot in a vertical plane from a vertical tree felling position to a horizontal position for delivering trees to said buncher means, the feller means including an elongated frame, spaced apart upper and lower gripper means provided on the frame, cutting means on the frame adjacent the lower gripper means, said feller means also including a cradle having a pair of arms hingedly joined to the front chassis, first motor means connected between the arms and said front chassis to cause vertical pivoting movement of the cradle, a universal joint interconnecting said elongated frame and said cradle and second motor means to effect movement of said frame, third motor means for activating said grippers, a pair of wheels for supporting each of the front and rear chassis, vehicle drive means mounted on the rear chassis and interconnected to the wheels on both the front and rear chassis and a fourth motor means for effecting relative movement therebetween.

2. An apparatus as defined in claim 1, wherein said cutting means on said elongated frame includes a carriage, an opening in the carriage for receiving the base of a tree, tracks provided longitudinally in said carriage, a blade having a cutting edge extending laterally of said carriage, the blade adapted to slide in said tracks longitudinally of said carriage and across said opening, motor means in said carriage being connected to the blade for effecting sliding movement to the blade, suitable for shearing through the tree, the blade edge having an angle of 87° to the longitudinal movement of the blade with the edge sloping inwardly.

3. An apparatus for harvesting trees comprising a vehicle having a front and rear chassis hinged together for movement in a horizontal plane, the front and rear chassis each including a pair of wheels mounted on axles, the hinge points between the front and rear chassis lying in a vertical plane taken longitudinally of the chassis at the mid-point between the axles, steering means provided for manoeuvring the front and rear chassis relative to each other, and comprising a pair of motor means spaced one on each side of the longitudinal vertical plane through the hinge points, a feller means pivotally mounted for movement in a vertical plane longitudinally of the front chassis and to the front end of the front chassis, the feller means including a generally vertical extending frame and the feller is in a forward position, gripper means provided on the frame and adapted to grip a standing tree, cutting means spaced below said gripping means on the frame, the cutting means being adapted to cut through the base of the tree while standing, feller means being operative to pivot in said vertical plane from said forward position to a delivery position in a generally horizontal position over the front chassis to dispose of said felled tree, and buncher means mounted on the rear chassis for bunching and retaining trees which have been delivered by the feller means.

4. An apparatus for handling elongated articles comprising a base, buncher means on the base comprising a pair of opposed arms pivoted in a vertical plane extending laterally of the base, finger members pivoted to each end of the arms for movement in said vertical plane, motor means associated with said arms for moving said arms from an open position for receiving the elongated articles to a closed position for bunching the elongated articles, linkage means connected to said fingers and associated with said motor means for operatively moving said fingers from an open position to an inwardly extending position overlying the bunched elongated members when said arms are in a closed position.

5. An apparatus as defined in claim 4, wherein elongated flexible means extend between the ends of said fingers near the opposite arms, so as to form an effective loop between the fingers for receiving and surrounding the elongated members as the arms are moved from an open position to a closed position.

6. An apparatus as defined in claim 5, wherein said elongated flexible means is associated with said linkage means and said motor means for reducing the effective length of the loop formed between the fingers as the arms are moved from an open position to a closed position.

7. An apparatus as defined in claim 6, wherein a single length of elongated flexible means is used and passes over the ends of the fingers to form a unitary loop between the fingers and the ends of the elongated flexible means are connected to said linkage means for effectively reducing the length of the unitary loop between the fingers as the arms close from an open position to a closed position.

8. An apparatus for handling articles as defined in claim 4, wherein the base is formed on a vehicle suitable for movement on rough terrain, feller means are pivotally mounted on one end of the vehicle adapted for movement in a vertical plane longitudinally of said vehicle between a tree felling position wherein said feller means grips the standing tree and severs it, and a dispensing position wherein the feller means delivers the severed tree longitudinally on the vehicle into the open bunching means.

References Cited

UNITED STATES PATENTS

| | | | |
|---|---|---|---|
| 2,751,943 | 6/1956 | Ford | 144—34 |
| 3,008,731 | 11/1961 | Bombardier | 144—3 |
| 3,074,447 | 1/1963 | Bombardier | 144—34 |
| 3,102,563 | 9/1963 | Horncastle | 144—3 |
| 3,183,952 | 5/1965 | Larson | 144—34 |
| 3,348,592 | 10/1967 | Winblad et al. | 144—309 |

FOREIGN PATENTS 141,698   2/1961   U.S.S.R.

GERALD A. DOST, Primary Examiner

U.S. Cl. X.R.

144—34